United States Patent
Murphy

[11] Patent Number: 5,861,698
[45] Date of Patent: Jan. 19, 1999

[54] GENERATOR ROTOR WITH RING KEY THAT REDUCES TOOTH TOP STRESS

[75] Inventor: Robert L. Murphy, Longwood, Fla.

[73] Assignee: Westinghouse Electric Corporation, Pittsburgh, Pa.

[21] Appl. No.: 819,433

[22] Filed: Mar. 17, 1997

[51] Int. Cl.$^6$ ...................................................... H02K 3/48
[52] U.S. Cl. ........................ 310/214; 310/215; 310/270; 310/271
[58] Field of Search ................... 310/214, 215, 310/270, 271

[56] References Cited

U.S. PATENT DOCUMENTS

| | | | |
|---|---|---|---|
| 4,197,476 | 4/1980 | Borgen et al. . | |
| 4,316,114 | 2/1982 | Zagorodnaya et al. | 310/270 |
| 5,113,114 | 5/1992 | Shih et al. | 310/270 |
| 5,118,979 | 6/1992 | Shih et al. | 310/214 |
| 5,174,011 | 12/1992 | Weigelt | 29/598 |
| 5,430,340 | 7/1995 | Shih | 310/214 |
| 5,493,462 | 2/1996 | Peter | 360/99.12 |
| 5,592,039 | 1/1997 | Guardiani | 310/113 |

FOREIGN PATENT DOCUMENTS

| | | | |
|---|---|---|---|
| 633192 | 12/1961 | Canada | 310/270 |
| 0041582 | 12/1981 | European Pat. Off. . | |
| 1588750 | 11/1969 | Germany . | |
| 233622 | 1/1975 | Germany . | |
| 1156-196 | 12/1983 | U.S.S.R. | 310/270 |

*Primary Examiner*—Nestor Ramirez
*Assistant Examiner*—Elvin G. Enad
*Attorney, Agent, or Firm*—Daniel C. Abeles; Eckert Seamans Cherin & Mellott, LLC

[57] ABSTRACT

A generator rotor that reduces friction force transmitted to rotor teeth by a retaining ring is disclosed. The friction force is caused by end windings pushing longitudinally outward against the retaining ring when the windings heat up during operation of the rotor. A ring key diminishes the friction force transmitted to a rotor teeth region by transmitting more of the friction force to a rotor pole region. The present invention accomplishes this reduction in transmission by either forming a gap between the ring key and the teeth regions, by producing only light contact between the ring key and the teeth regions, by the ring key being formed of a lower stiffness material in the areas in which it contacts the teeth regions, or by a combination of the above.

17 Claims, 9 Drawing Sheets

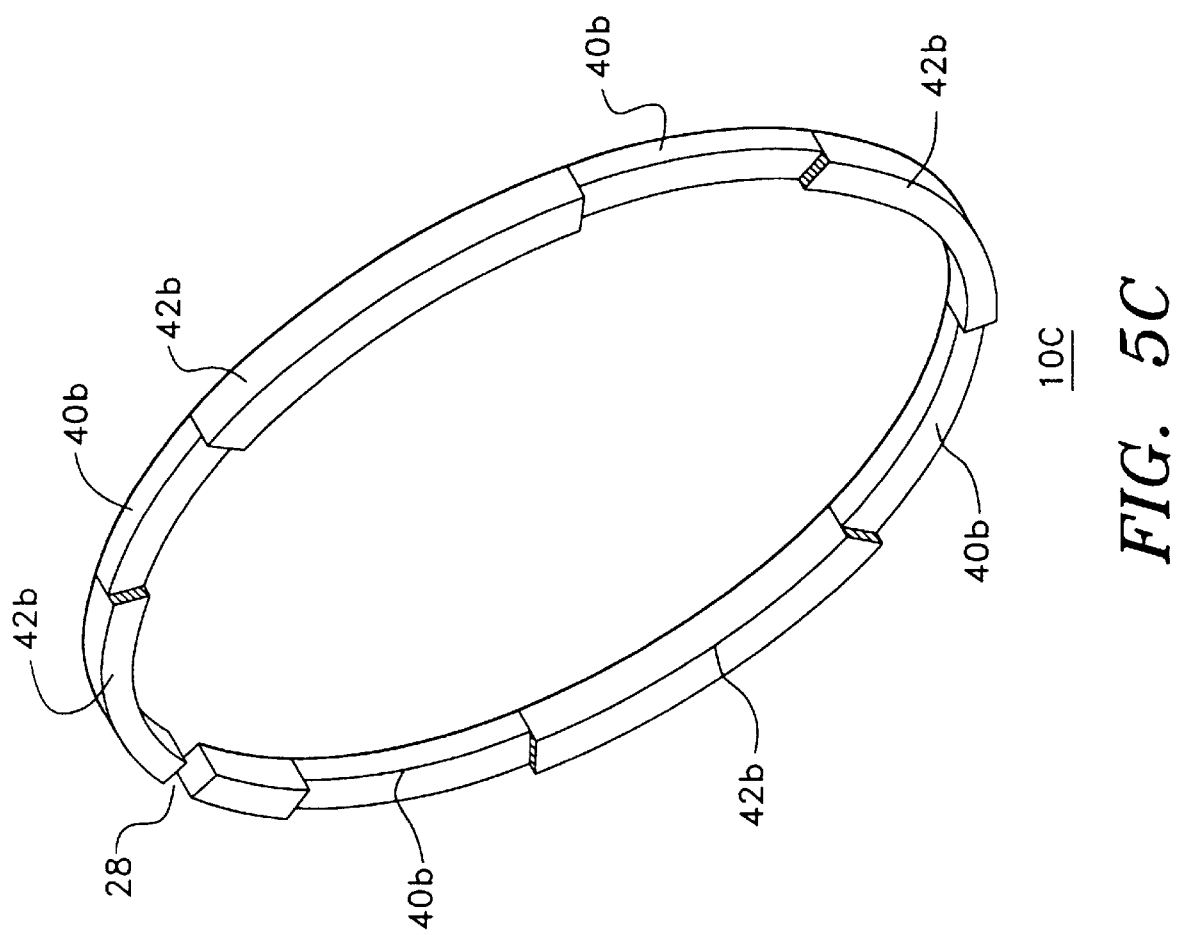

# GENERATOR ROTOR WITH RING KEY THAT REDUCES TOOTH TOP STRESS

FIELD OF THE INVENTION

This invention relates to generators for producing electricity, and more particularly, to generator rotors having retaining rings.

BACKGROUND

Generator rotors have a cylindrical rotor body from which two shafts extend at each rotor end. The rotor is angularly divided into teeth regions and pole regions. The teeth regions have a series of teeth that are defined by longitudinal slots cut into the rotor. The slots contain field windings and wedges for hold the windings in place against centrifugal force caused by the rotor rotation.

Referring to FIG. 3, windings 120 axially extend beyond the rotor teeth 116 at each end of the rotor body where they bend to form winding end turns. Because the end turns are in an area that lacks teeth 116 and wedges 119 to restrain centrifugal force, an annular retaining 114 ring is placed around the end turns and rotor end so as to restrain the end turns against centrifugal force. The retaining ring 114 is longitudinally held in place by a ring key 110 having a radial split 28, as shown in FIG. 2, which fits into opposing, circumferential grooves 130a, 130b in the retaining ring 110 and the rotor 112, respectively. In FIG. 3, components unrelated to the present invention, such as filler blocks and damper bars, are omitted for clarity.

During operation of the generator, the rotor 112, especially the windings and end turns, heat up. Thermal expansion causes the end windings to push axially outward against the retaining ring 114, resulting in an axially outward force, termed "friction force." Because the ring key 110 limits the retaining ring 114 from longitudinally moving relative to the rotor 112, the ring key 110 transmits to the rotor 112 the friction force, as well as other longitudinal forces having the same direction. Because the conventional ring key 110, shown in FIG. 2, has approximately uniform thickness and hardness throughout it circumference, the friction force is approximately evenly transmitted to the teeth regions and pole regions of the rotor. The portion of the friction force that is transferred to the rotor teeth is problematic because the teeth are already subject to high radial stress caused by centrifugal force from the windings and wedges. Such high stress has caused cracking in the tooth tops.

There is, therefore, a need for a generator rotor having a ring key that diminishes the longitudinal friction force in the teeth region of the rotor.

SUMMARY OF THE INVENTION

A generator rotor having a ring key that diminishes longitudinal friction force transmitted to the rotor teeth is provided. The ring key diminishes the portion of the friction force that is transmitted to the rotor teeth region by transmitting much of such friction force instead to the rotor pole region.

In an embodiment of the present invention, the ring key has relief regions (that is, regions of reduced axial thickness) that are approximately angularly aligned with teeth regions of the rotor. Ring key projection regions (that is, regions of relatively greater axial thickness than the relief regions), which are interspaced between the relief regions, are approximately angularly aligned with rotor pole regions. When the rotor is at a normal operating temperature, the projection regions urge against the rotor pole regions so as to restrain the retaining ring longitudinal movement. In contrast to the contact between the projection regions and pole regions, the relief regions and teeth regions form a gap therebetween when the rotor is at a normal operating temperature. Because of this gap, the retaining ring diminishes the longitudinal friction force transmitted to the teeth.

The amount of relief (that is, the amount of the reduction in axial thickness) in the relief region may also be sized so as to permit light contact, rather than a gap, between the relief regions and the teeth regions. Such light contact would transmit some, although a diminished amount, of the friction force to the teeth.

In another embodiment, rather than providing a ring key with relief and projection regions, a ring key is provided that is formed from two separate materials having different stiffnesses. Specifically, regions of the ring key that contact the rotor teeth region are formed from a material that possesses lower stiffness than the ring key material that contacts the pole regions. Yet another embodiment combines features of the first two embodiments by providing ring key relief regions formed of lower stiffness material than key projection regions material. In this latter embodiment, the amount of relief is chosen so as to permit light contact between the relief regions and the rotor teeth regions.

BRIEF DESCRIPTION OF THE DRAWINGS

FIG. 4 is cross sectional view of a generator rotor of the type employing the present invention with the windings, retaining ring, and ring key removed.

FIG. 4A is a detail view of the tooth top of FIG. 4.

FIGS. 5A, 5B, and 5C are perspective views of the ring key according to multiple embodiments of the present invention.

DESCRIPTION OF PREFERRED EMBODIMENTS

The present invention is illustrated herein using a specific generator rotor 12, however, the present invention is not limited thereto. For example, the FIG. 5A shows a ring key 10 having four projection regions 34 corresponding to a four pole generator rotor 12. The present invention, however, may be employed with generator rotors having other quantities of poles and other geometries than as shown.

Figure 1:
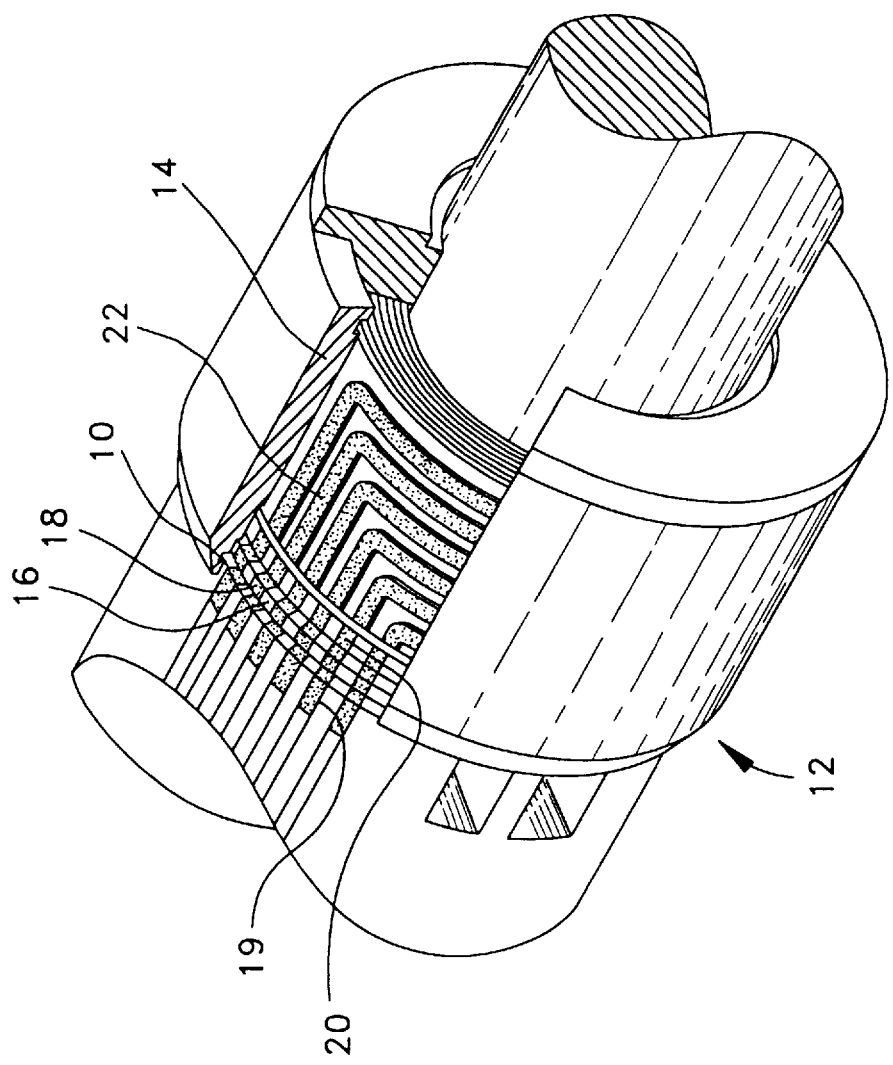
FIG. 1 is a perspective view of a generator rotor of the type employing the present invention.
Figure 2:
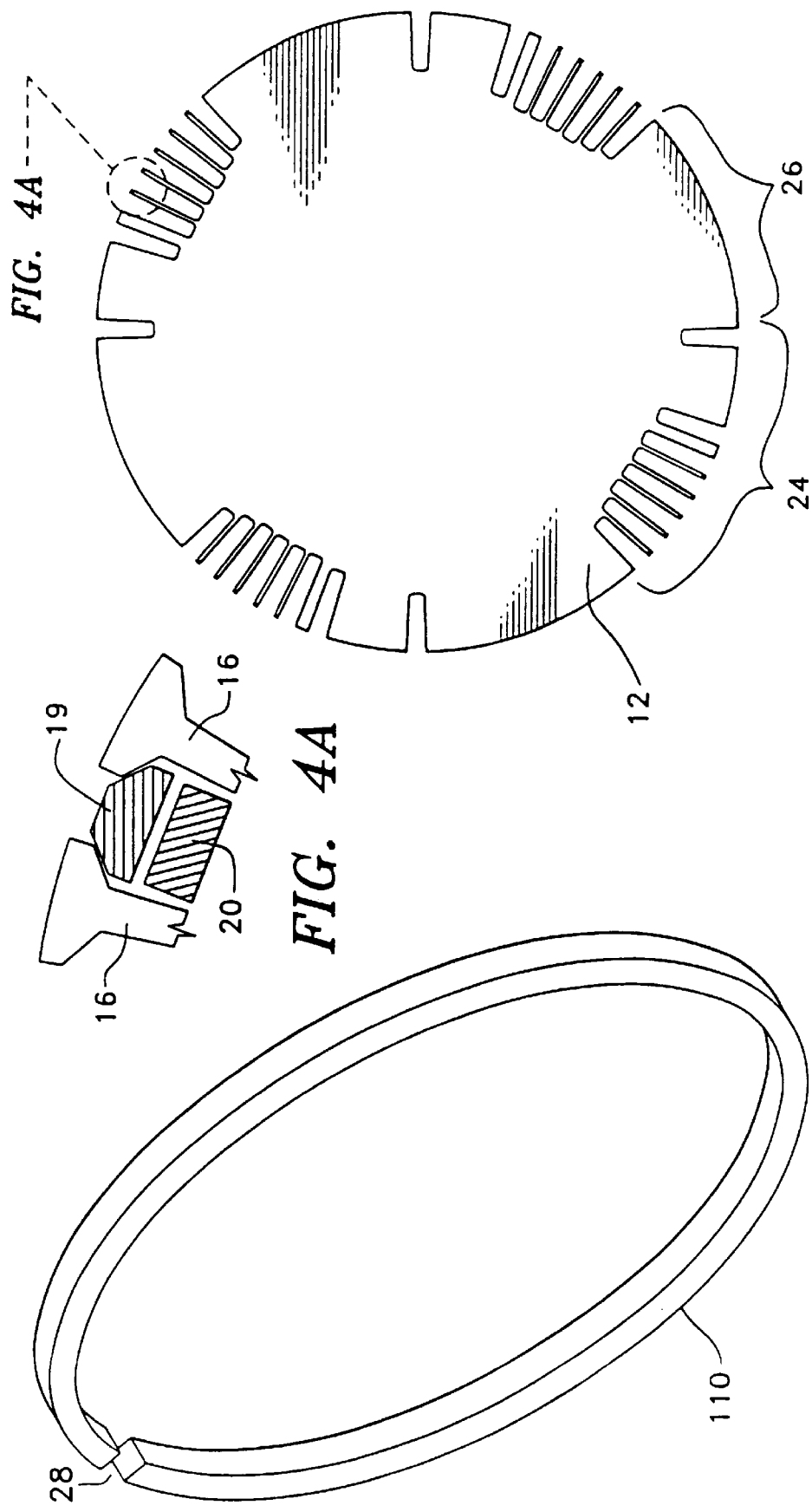
FIG. 2 is a perspective view of a conventional ring key.
Figure 3:
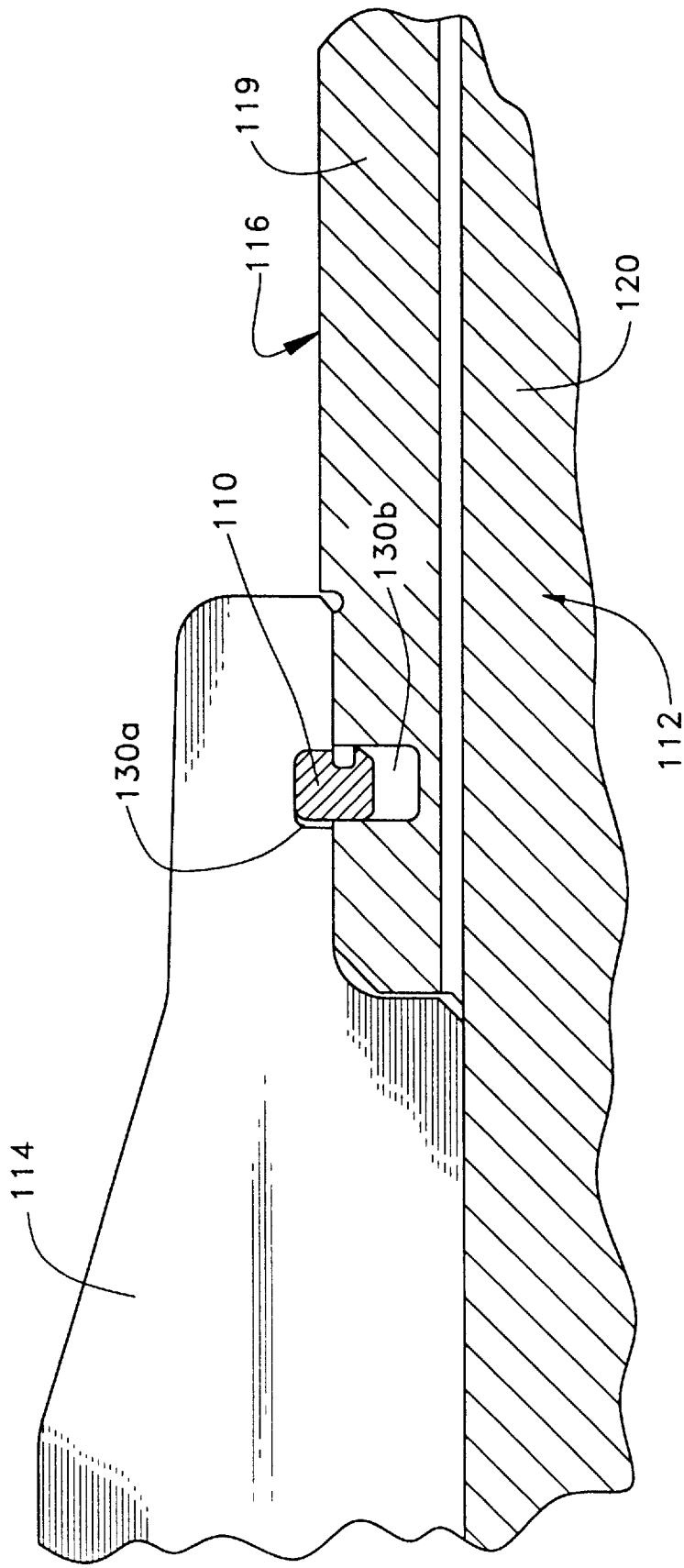
FIG. 3 is a view of a conventional ring key assembled to a rotor.

Referring now to FIGS. 1, there is shown a two pole generator rotor 12 of the type employing the present invention. FIGS. 4 and 5A through 5C show the ring key 10 corresponding to a four pole generator that has four teeth regions 24 and four pole regions 26. Each teeth region 24 is formed by several longitudinal slots 18, which are interspaced between a plurality of teeth 16. The teeth 16 and slots 18 typically span the length of the rotor 12. Wedges 19 and field windings 20 are conventionally tightly installed into each of the slots 18. End turns 22 of the windings 20 on each end of the rotor 12 are restrained by a retaining ring 14. A ring key 10 is located partially within a circumferential groove 30a within the retaining ring 14 and partially within an opposing circumferential groove 30b in the rotor 12, as shown in FIG. 6A, 6B, and 6C.

Three embodiments of the present invention exemplify the present invention. In the first embodiment of the present invention, shown in FIGS. 5A, 6A, and 7, the ring key 10a has four relief regions 32 and four projection regions 34. The key projection regions 34 are angularly aligned with the rotor pole regions 26. The key relief regions 32, which have approximately the same arc length as the rotor teeth regions 24, also are angularly aligned with the rotor teeth regions 24. As used herein and in the appended claims, the term "relief region" means a region of the ring key that has a smaller thickness than a corresponding "projection region" of the ring key.

Preferably, the differential axial thickness between the relief regions 32 and the projection regions 34 is from 0.0101" to 0.015" for a "four pole, 67" closed slot" generator rotor as supplied by Westinghouse Electric Corporation, Pittsburgh, Pa. 15222. This differential axial thickness may vary when the present invention is employed in other generators having other rotor diameters. The dimensions of the differential axial thicknesses when so employed will be apparent to those skilled in the art who are familiar with these other generators having other diameters.

Figure 5A:
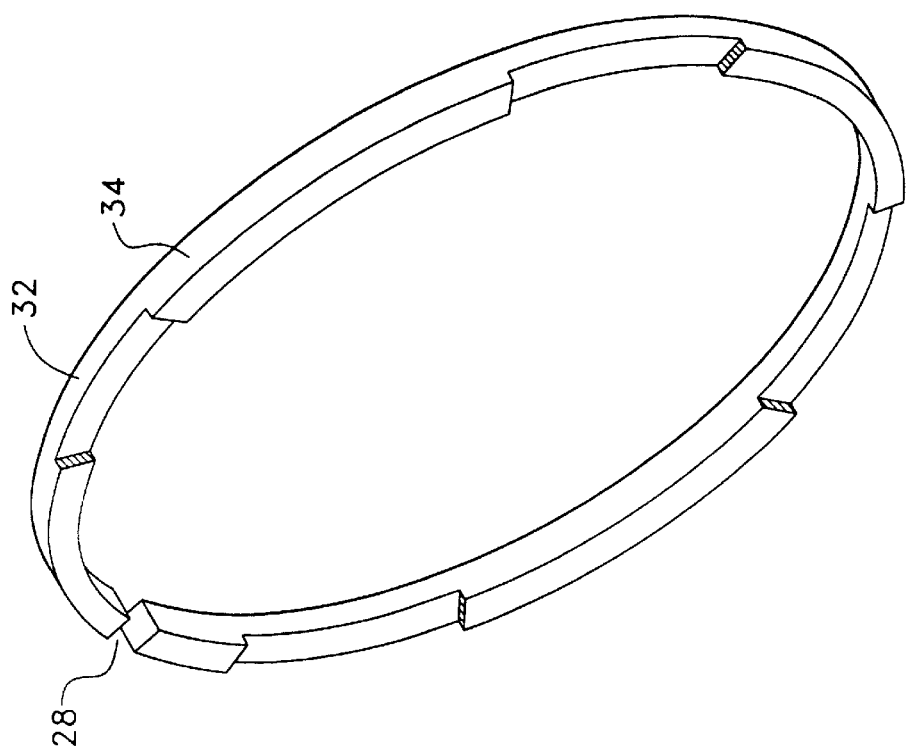
Figure 6A:
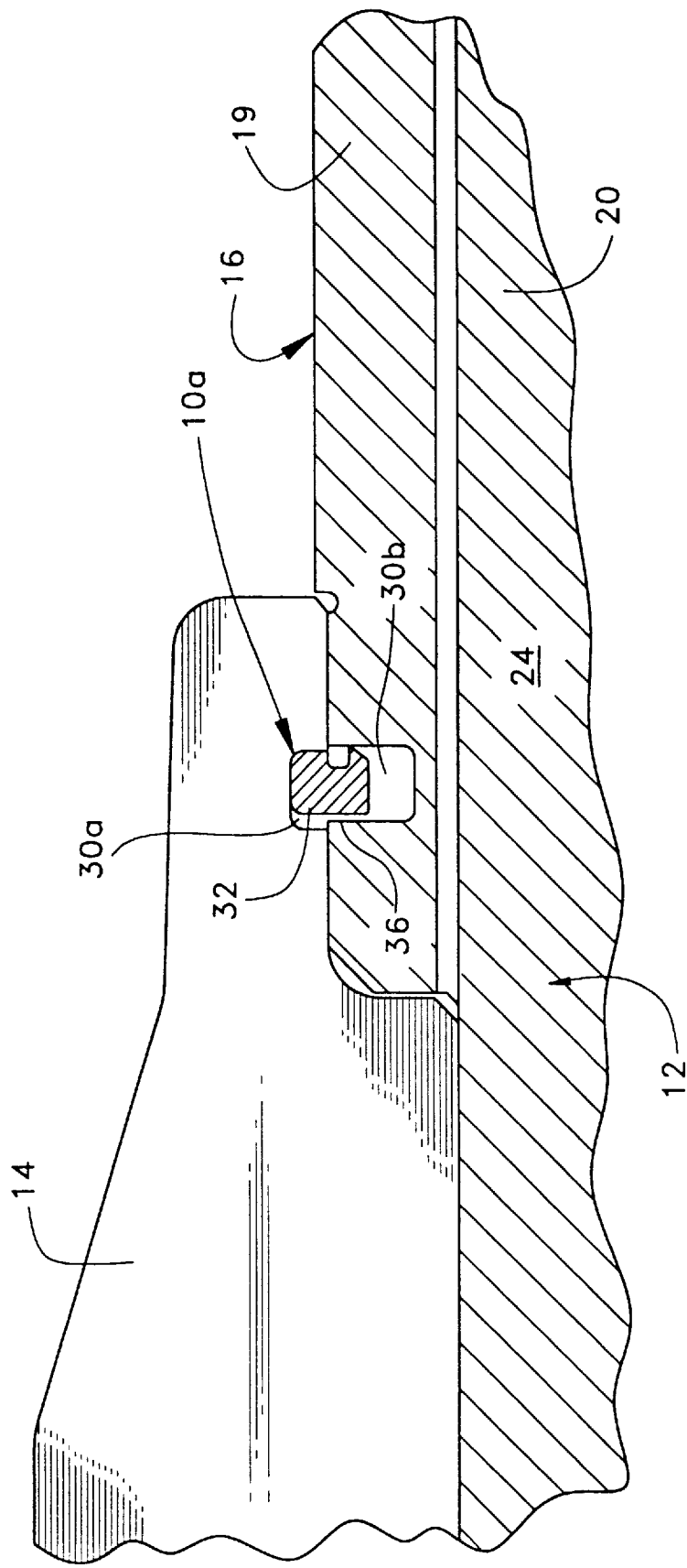
FIGS. 6A, 6B, and 6C are views of the retaining ring assembled to the rotor in the rotor teeth region, according to multiple embodiments of the present invention.
Figure 7:
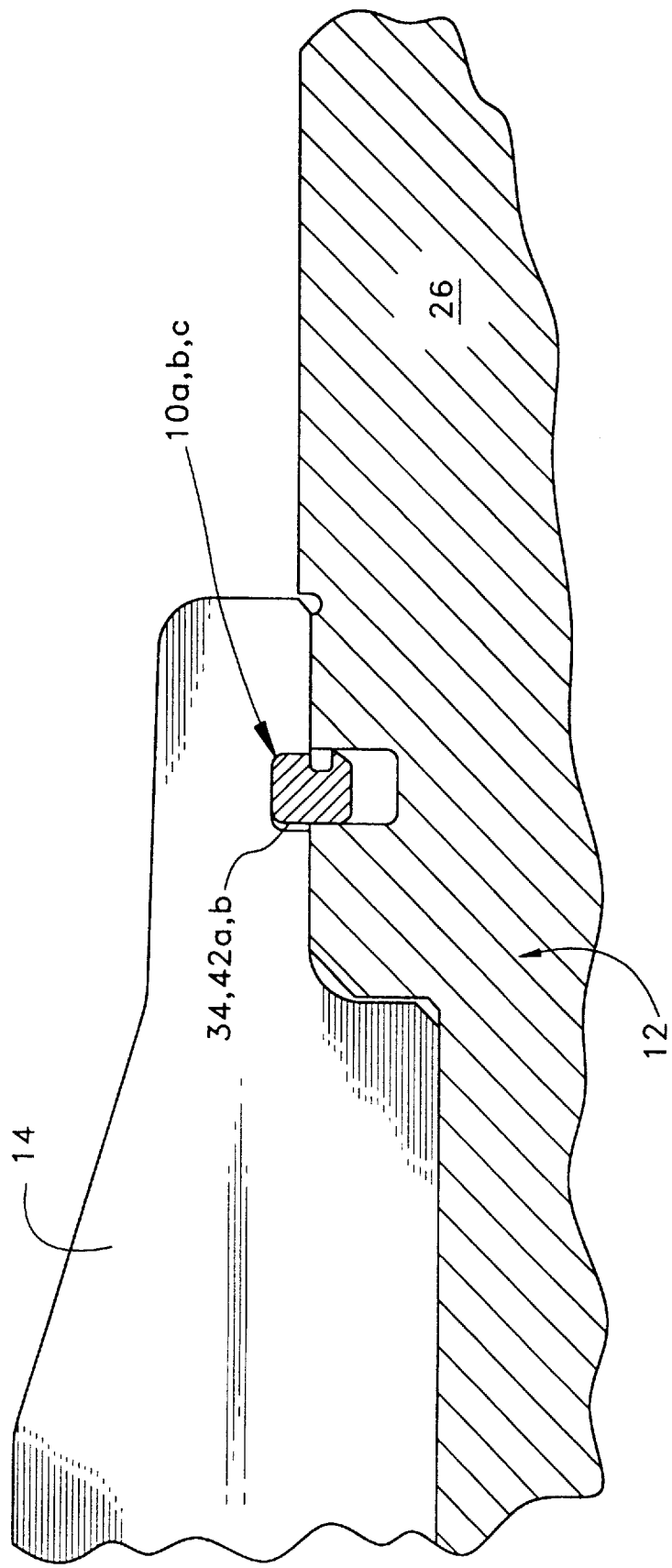
FIG. 7 is a view of the retaining ring assembled to the rotor in the rotor pole region, according to multiple embodiments of the present invention.

Referring again to FIGS. 5A, 6A, and 7, the ring key relief regions 32 face the outboard side of the rotor 12. When the rotor 12 is at a normal operating temperature, the projection regions 34 contact the rotor pole regions 26, as shown in FIG. 7. While the projection regions 34 urge against the pole regions 26, the differential axial thickness between the relief regions 32 and the projection regions 34 results in a gap 36 between the relief regions 32 and the rotor teeth regions 24, as shown in FIG. 6A. The present invention also encompasses differential axial thicknesses that permit light contact between the teeth region 24 and the relief region 32. Specifically, a diminished amount of relief (that is, a smaller dimension of differential thickness) may be provided so as to not form a gap 36 between the relief regions 32 and the teeth regions 24, but rather to permit light contact therebetween.

Figure 5B:
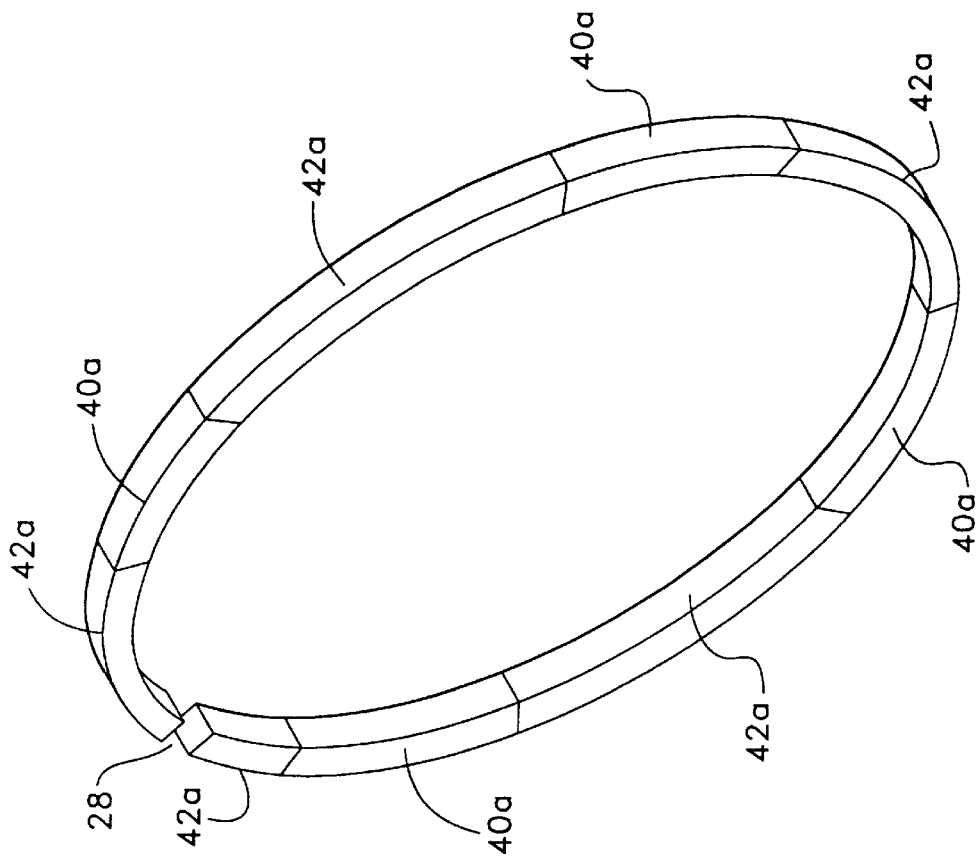
Figure 6B:
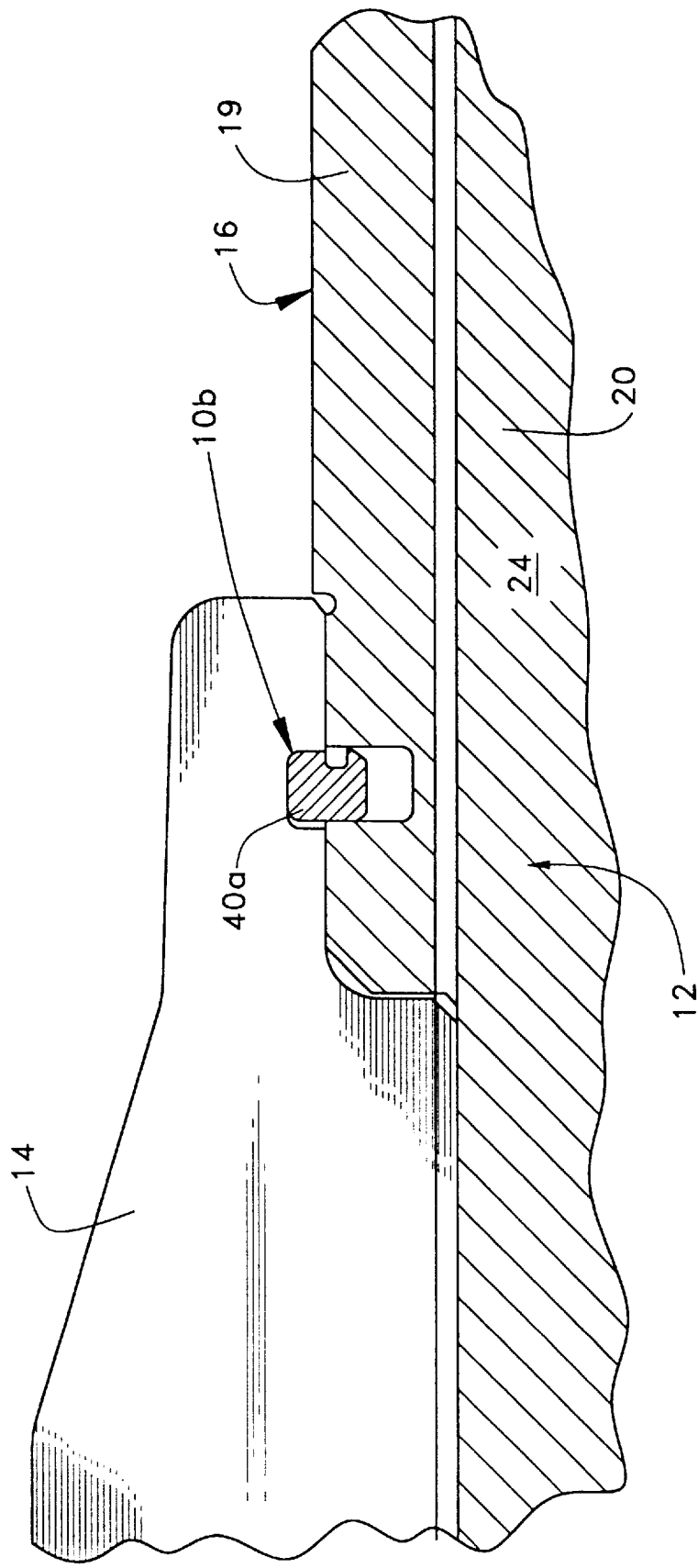
Figure 6C:
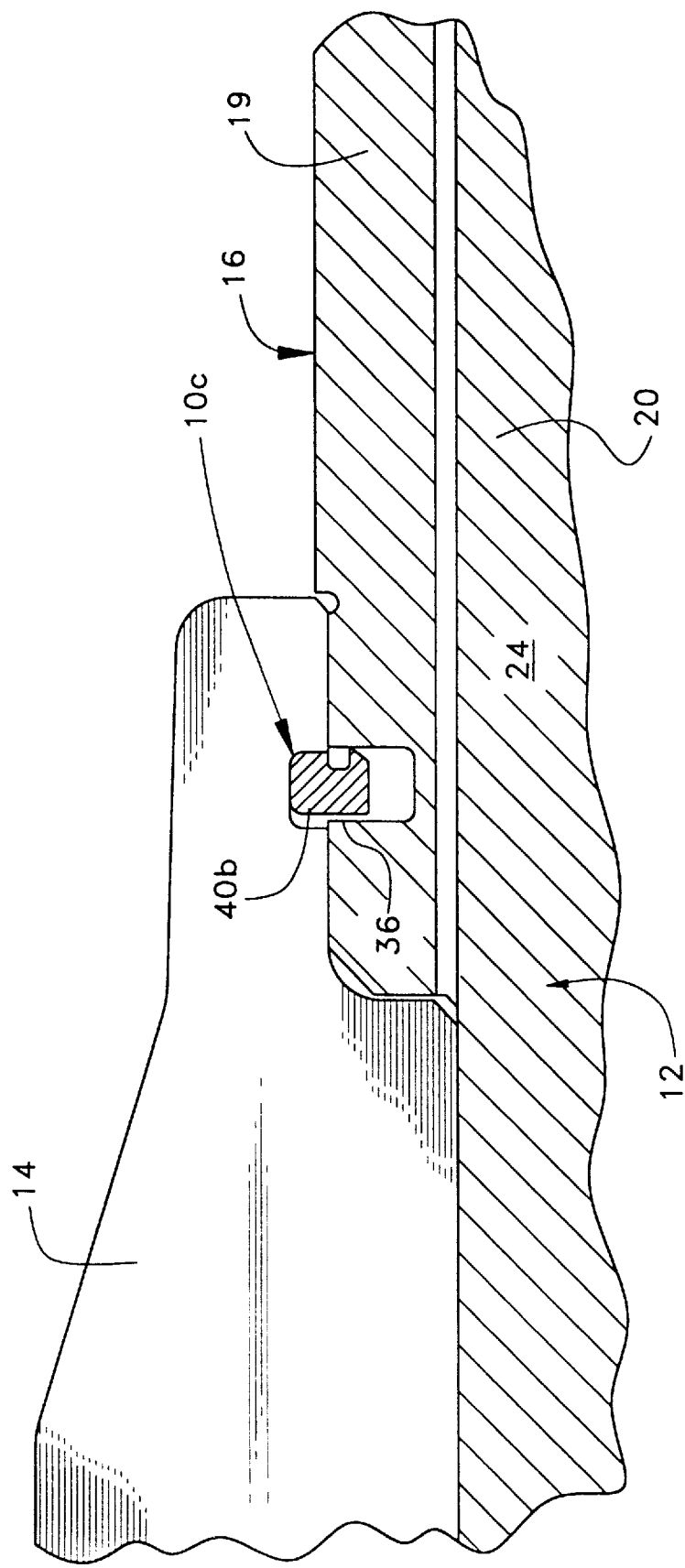

Referring to FIGS. 5B, 6B, and 7, which show a second embodiment of the present invention, the ring key lob is formed from two separate metals. Four key first regions 40a are formed from a low stiffness metal, for example aluminum. The first regions 40a are approximately angularly aligned with the four rotor teeth regions 24. Four key second regions 42a are formed from a high stiffness material, for example steel. The second regions 42a are approximately angularly aligned with the four rotor pole regions 26. Because the first regions 40a and second regions 42a have the same axial thickness (that is, there is no relief), the first regions 40a contact the rotor teeth regions 24 when the rotor 12 is at a normal operating temperature.

Referring to FIGS. 5C, 6C, and 7, a third embodiment of the present invention is shown that has features of both the first and second embodiments. The ring key 10c has four relief regions 40b formed from a first material and four projection regions 42b formed from a second material. Preferably, the first material is a low stiffness metal, for example aluminum, and the second material is a high stiffness metal, for example steel. The relief regions 40b are approximately angularly aligned with the four rotor teeth regions 24. The projection regions 42b are approximately angularly aligned with the rotor pole region 26. Preferably, the differential axial thickness between the relief regions 40b and projection regions 42b is such that light contact exists between the relief regions 40a and the rotor teeth regions 24 when rotor 12 is at a normal operating temperature. The dimensions of the relief regions 40b and 42b to provide such light contact for a particular generator model will be apparent to those skilled in the art who are familiar with the particular generator model.

The operation of the present invention will now be described. When the rotor 12 reaches a normal operating temperature, the friction force urges the retaining ring 14 longitudinally outward against the ring key 10a or 10c. As a result, the key projection regions 34 or 42b urge against the rotor pole regions while a gap has formed between the relief regions 32 or 40b and the rotor teeth regions 24. By eliminating contact between the ring key 10a or 10c and the teeth regions 24, the ring key reduces the friction force transmitted to the teeth region 24, thereby reducing tooth stress. Embodiments in which the relief regions 32 or 40b are sized so as to permit light contact between the relief regions 32 or 40b and the teeth regions 24 similarly reduce friction force.

The ring key lob according to the second embodiment similarly reduces friction force transmitted to the rotor teeth region 24. When the rotor 12 reaches a normal operating temperature, the key first regions 40a and second regions 42a urge against the rotor teeth regions 24 and pole regions 26, respectively. The first regions 40a transmit less friction force to the rotor 12 than do the second regions 42b because of the lower stiffness of the first region 40a compared with the second region 42a.

The present invention may be embodied in other specific forms without departing from the spirit or essential attributes thereof and, accordingly, reference should be made to the appended claims, rather than to the foregoing specification, as indicating the scope of the invention.

I claim:

1. An annular ring key for distributing longitudinal frictional force transmitted to a generator rotor from a retaining ring of said rotor, said ring key comprising a plurality of relief regions and a plurality of projection regions on said ring key through which said longitudinal frictional force is transmitted by said ring key from said retaining ring to said rotor, said plurality of relief regions being approximately angularly aligned with teeth regions of the rotor, said plurality of projection regions being approximately angularly aligned with pole regions of the rotor, said ring key being at least partially disposed within a circumferential groove in the rotor and at least partially disposed within a circumferential groove in the retaining ring.

2. The ring key of claim 1 wherein said ring key has at least one radial split therein.

3. The ring key of claim 1 wherein said plurality of relief regions and said plurality of rotor teeth regions are spaced apart to define gaps therebetween while the rotor is at a normal operating temperature.

4. The ring key of claim 1 wherein at least one of said plurality of relief regions contacts the teeth regions of the rotor while the rotor is at a normal operating temperature.

5. The ring key of claim 1 wherein an axial thickness of each one of the plurality of projection regions is from 0.010 inches to 0.015 inches larger than an axial thickness of each one of the plurality of relief regions.

6. An annular ring key for limiting longitudinal translation of a retaining ring relative to a generator rotor, said ring key being partially disposed within a circumferential groove in the rotor and partially disposed within a circumferential groove in the retaining ring, said ring key comprising a plurality of first regions and a plurality of second regions, said plurality of first regions being approximately angularly aligned with pole regions of the rotor, each one of said plurality of second regions being approximately angularly aligned with teeth region of the rotor; each one of said plurality of first regions being formed from a first material and each one of said plurality of second regions being formed from a second material.

7. The ring key of claim 6 wherein said first material has a higher stiffness than said second material.

8. The ring key of claim 6 wherein said first material comprises a first metal and said second material comprises a second metal, said first metal having a higher stiffness than said second metal.

9. The ring key of claim 6 wherein said ring key has at least one radial split therein.

10. The ring key of claim 6 wherein each one of said plurality of first regions has approximately the same axial thickness as each one of said plurality of second regions.

11. The ring key of claim 6 wherein each one of said plurality of first regions forms a projection region and each one of said plurality of second regions forms a relief region.

12. The ring key of claim 11 wherein said ring key relief regions and said rotor teeth regions are spaced apart to define gaps therebetween while the rotor is at a normal operating temperature.

13. The ring key of claim 11 wherein at least one of said plurality of relief regions contacts the teeth regions of the rotor while the rotor is at a normal operating temperature.

14. A generator system for producing electricity, comprising a substantially cylindrical rotor having two ends, each one of said two rotor ends having:

a plurality of teeth regions, a plurality of pole regions, and a circumferential groove formed there around, each one of said plurality of teeth region having a plurality of longitudinal teeth and a plurality of longitudinal slots formed therein;

a plurality of field windings being disposed within said plurality of slots, said field windings forming end turns proximate said rotor end;

an annular retaining ring having a circumferential groove formed therein and being disposed around the rotor end turns; said retaining ring groove being proximate said rotor groove; and an annular ring key having a plurality of first regions and a plurality of second regions; said plurality of first regions being in approximate angular alignment with said pole regions of the rotor, said plurality of second regions being in approximate angular alignment with the plurality of teeth regions of the rotor, said ring key being disposed at least partially within the rotor groove and at least partially within the retaining ring groove.

15. The generator system of claim 14 wherein each one of said plurality of first regions forms a projection region and each one of said plurality of second regions forms a relief region.

16. The generator system of claim 15 wherein each one of said plurality of first projection regions is formed from a first material and each one of said plurality of relief regions is formed from a second material, said first material having a higher stiffness than said second material.

17. The generator system of claim 14 wherein each one of said plurality of first regions is formed from a first material and each one of said plurality of second regions is formed from a second material, said first material having a higher stiffness than said second material.

* * * * *